United States Patent [19]

Cherniak

[11] 4,396,034

[45] Aug. 2, 1983

[54] ARCUATE SWING CHECK VALVE

[76] Inventor: George S. Cherniak, 830 N. Atlantic Ave. #1502B, Cocoa Beach, Fla. 32931

[21] Appl. No.: 315,046

[22] Filed: Oct. 26, 1981

Related U.S. Application Data

[63] Continuation-in-part of Ser. No. 236,893, Feb. 23, 1981, abandoned.

[51] Int. Cl.³ ............................................. F16K 15/03
[52] U.S. Cl. ................................... 137/514; 137/527; 137/527.8
[58] Field of Search ............... 137/514, 527, 527.2, 137/527.4, 527.6, 527.8; 251/299

[56] References Cited

U.S. PATENT DOCUMENTS

| 385,292 | 6/1888 | Baltzley . | |
|---|---|---|---|
| 497,351 | 5/1883 | Shields | 137/527.8 |
| 1,000,719 | 8/1911 | Cram | 137/527.8 X |
| 1,926,759 | 9/1933 | Wallman | 137/527.8 X |
| 2,913,001 | 11/1959 | Maslow | 137/527.4 |
| 2,956,582 | 10/1960 | Pranter | 137/512.1 |
| 3,127,148 | 3/1964 | Collar | 251/149.2 |
| 3,334,652 | 8/1967 | Wheatley | 137/527.8 |
| 3,589,392 | 6/1971 | Meyer | 137/525.1 |
| 3,937,240 | 2/1976 | Nanny | 137/527.8 |
| 4,007,909 | 2/1977 | Buseth et al. | 251/149.2 |
| 4,034,780 | 7/1977 | Horvath | 137/527.8 |
| 4,178,638 | 12/1979 | Meyer | 3/1.5 |

Primary Examiner—Robert G. Nilson
Attorney, Agent, or Firm—George N. Woodruff

[57] ABSTRACT

A check valve for controlling the flow of fluid in a conduit so that flow in one direction is unimpeded and flow in the opposite direction is prevented which provides in the open position an unimpeded fluid passage permitted the passage of cleaning tools or material separators through the valve. A valve seat and an arcuate valve sealing member are formed with mating bi-planar sealing surfaces, the valve seat being formed by making intersecting 45 degree cuts from the transverse end plane of a tubular member to the horizontal diametral plane and the valve sealing member being formed by making 45 degree intersecting cuts from the periphery of a corresponding tubular member to the horizontal diametral plane, producing an arcuate member, which in the open position has the configuration of the interior of the valve body.

15 Claims, 9 Drawing Figures

ARCUATE SWING CHECK VALVE

RELATED U.S. APPLICATION DATA

This application is a continuation-in-part of my application 236,893, Filed Feb. 23, 1981, now abandoned.

BACKGROUND OF THE INVENTION

Check valves are self-actuating devices used in fluid handling systems to permit free flow of the fluid in one direction and to prevent flow in the opposite direction. The basic elements of industrial check valves are a sealing member which may be a plate, disk, or poppet, hinged or supported in a valve body so that flow in one direction causes the sealing member to move away from a valve seat while flow in the opposite direction causes the sealing member to move against the valve seat, providing a flow tight seal. Springs may be provided to assist the sealing member to close on flow reversal and to maintain it in firm contact with the valve seat. Damping devices may be installed to prevent the valve from slamming closed when flow is suddenly reversed.

Swing check valves in which a hinged sealing member or members are moved out of the fluid path by flow in the preferred direction and move back against a sealing surface when flow stops or reverses find widespread use in applications where cleaning tools or material separators must be passed through the line.

The most common type of swing check valve in general use is the flat plate type, typified by Wheatley, U.S. Pat. No. 3,334,652. A flat plate valve requires, however that a housing be provided for containing the plate when it is swung from the closed position to the open position resulting in a heavy, cumbersome structure when large diameter valves are involved.

A second form of swing check valves employs an arcuate member or members as the sealing elements. In the arcuate check valve the sealing element or elements having the same geometry as that of the fluid passage so that when swung out of the flow path the sealing element or elements lie on the interior wall of the fluid passage. Arcuate check valves may be of the split leaf type as shown in Noll, U.S. Pat. No. 586,618; Pranter, U.S. Pat. No. 2,956,582; Collar, U.S. Pat. No. 3,127,148 and Upham, U.S. Pat. No. 4,209,037 or of the single element type typified by Maslow, U.S. Pat. No. 2,913,001. A disadvantage of these valves, which the present invention seeks to overcome, is that, when closed, they are required to seal on planes both perpendicular and parallel to the direction of reverse fluid flow, complicating the problem of obtaining a leak proof seal.

The principal objective of this invention is to provide an arcuate swing check valve with sealing surfaces having a single fixed angle to the direction of reverse fluid flow.

A second objective is to provide a check valve which, in the open position has an unobstructed flow passage through the valve permitting the passage through the valve of cleaning tools or material separators.

Another objective of the present invention is to provide a valve which reduces turbulence within the valve to a theoretical and practical limit, thus reducing pressure drop through the valve.

A further objective of this invention is to provide check valve which can be simply fabricated from cylindrical sections of pipe or conduit without requiring castings and which significantly reduces the machining required to fabricate a check valve.

Still a further objective of this invention is to provide a check valve which reduces the overall size and weight of a valve to its practical and theoretical minimum.

And yet another objective of the present invention is to use the reverse flow, which closes the valve, to cause self alignment of the sealing member with respect to the valve seat so as to provide positive self alignment of the sealing member on the valve seat.

BRIEF SUMMARY OF THE INVENTION

This invention describes an arcuate swing check valve which overcomes several of the disadvantages of other swing check valves previously discussed. In the present invention an arcuate valve sealing member is developed by making two intersecting 45 degree cuts from the periphery of a tubular member to the horizontal diametral plane and using the portion removed as a sealing member. A mating valve seat is developed by making two intersecting 45 degree cuts from the end transverse plane of a similar tubular member to the horizontal diametral plane. When the arcuate valve sealing member is rotated 90 degrees from its position in engagement with the valve seat it has the configuration of the inner wall of the valve housing and presents no impediment to free flow of liquid through the valve in the preferred direction or to the free passage of cleaning tools or material separators through the valve.

An advantage of this development of the valve seat and arcuate valve sealing member is that all elements of the valve are made by making linear cuts from cylindrical members, castings for the valkve body and other components are not required and the cost of fabrication of the valve is minimized.

BRIEF DESCRIPTION OF THE DRAWINGS

Referring now to the drawings, wherein like numerals are employed to designate like parts throughout.

DETAILED DESCRIPTION OF THE INVENTION

Figure 1:
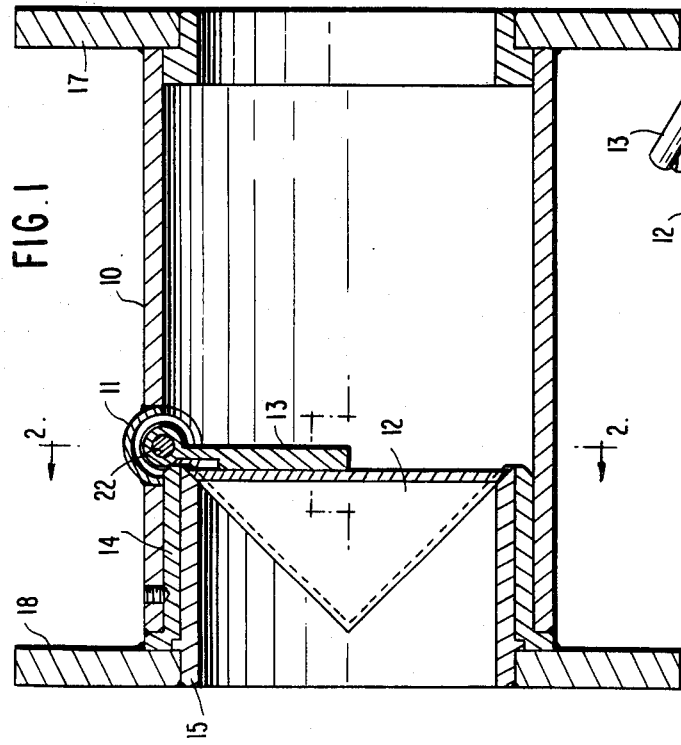
FIG. 1 is a vertical longitudinal section of the valve in its closed position.

Referring now to the drawings and particularly to FIG. 1, there is shown a valve body 10 provided with a transverse pivot housing 11. Valve body 10 is provided with flanges 17 and 18 for connection of the valve to a pipeline. An arcuate valve sealing member 12 is supported by hinge member 13, pivoting on pivot pin 22 external to the valve body. Hinge member 13 and arcuate valve sealing member 12 are free to rotate 90 degrees from the position shown in this drawing to a position where hinge member 13 and sealing element 12 are concentric with the inner wall of valve body 10 as will be later shown.

A tubular insert 14 is provided to support and center valve seat 15 within the valve body 10. In this view arcuate valve sealing member 12 is engaged with valve seat 15 and flow through the valve in the direction of from right to left is prevented.

Figure 2:
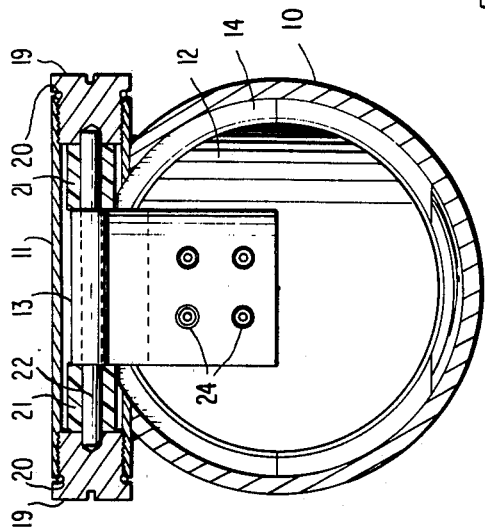
FIG. 2 is a transverse sectional view taken along the line 2—2 of FIG. 1.

Referring now to FIG. 2, a section taken along line 2—2 of FIG. 1, further details of the construction may be appreciated. Hinge pin 22 is supported within pivot pin housing 11 by closure members 19 and spacers 21, which serve to limit the transverse motion of hinge member 13 and attached arcuate valve sealing member 12. Washers 20 are provided for liquid tight sealing of the pivot pin housing since it is exposed to the fluid within the valve.

Figure 3:
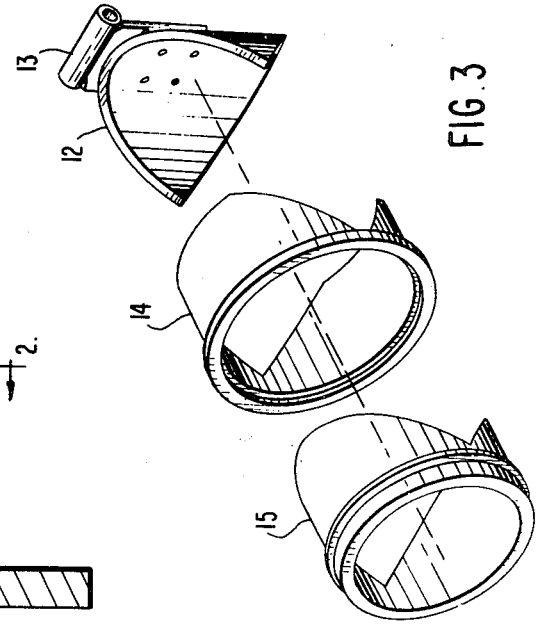
FIG. 3 is a perspective exploded view of the arcuate valve sealing member, valve seat and tubular insert.

Referring now to FIG. 3, the particular arcuate form of the arcuate sealing member 12 and its mating seat 15 together with tubular insert 14 are clearly shown. Arcuate valve sealing member 12 is developed by making two intersecting 45 degree cuts from the periphery of a tubular member to the horizontal diametral plane and using the portion removed as the sealing member. This produces an arcuate member having a semi-circular configuration in the transverse plane and having bi-planer sealing surfaces.

Valve seat 15 has bi-planar sealing surfaces which mate with those formed on arcuate valve sealing member 12 which are formed by making two intersecting 45 degree cuts from the transverse end plane of a tubular member to the horizontal diametral plane. Tubular insert 14 is formed just as valve seat 15 is except that a transverse relief cut must be provided so as to prevent the spacer from interfering with hinge member 13 in the closed position.

The mating sealing surfaces of the arcuate valve sealing member and the valve seat meet along fixed surfaces at an angle of 45 degrees to the direction of fluid flow.

This method of development of sealing surfaces on the valve seat and arcuate valve sealing member provides a valve construction which is extremely easy to fabricate and requires no castings or specialized machining. It will be appreciated by those skilled in the art that every single component of the valve shown is fabricatable from tubular or solid cylindrical members and that its fabrication involves a minimum of machining and welding.

Figure 4:
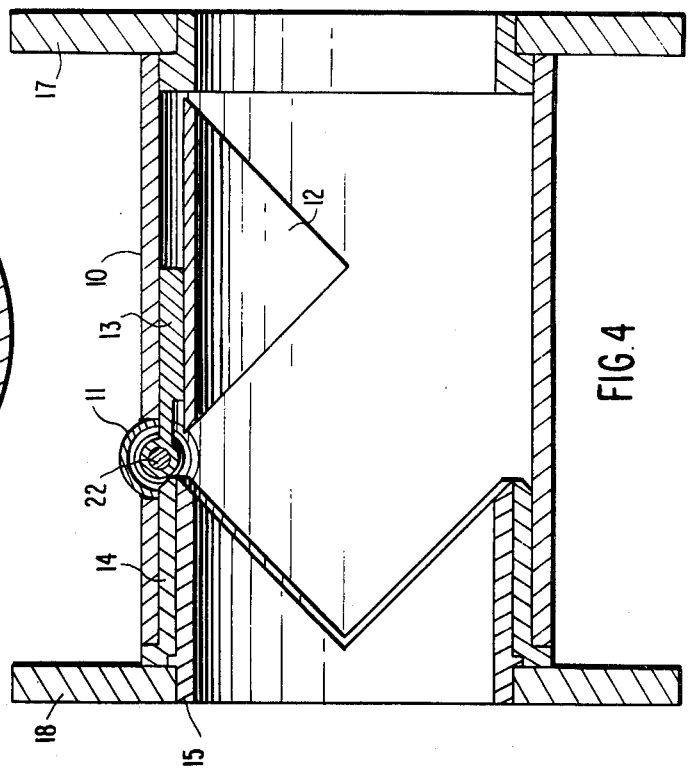
FIG. 4 is a vertical longitudinal section of the valve in the open position.

Referring now to FIG. 4, the valve is shown in its open position, where flow in the direction of from left to right has moved arcuate valve sealing member 12 and hinge member 13 90 degrees away from engagement with valve seat 15. An unobstructed flow passage is now provided through the valve which permits passage of cleaning tools or material separators through the pipeline and the valve. When flow in the preferred direction stops or is reversed arcuate valve sealing member 12 will swing back 90 degrees to engage valve seat 15 and prevent reverse flow. As the arcuate valve sealing member approaches engagement with the valve seat the symmetrical flow conditions around the sealing member and the tubular element center the sealing member on the valve seat.

The foregoing has described a valve in which the sealing member maintains engagement with the valve seat by gravity or by reverse pressure acting on the arcuate valve sealing member. In many applications this may not be sufficient to produce a leakproof seal and methods of providing positive engagement of the two sealing surfaces must be employed. In the present invention this may be accomplished internally or externally.

Figure 5:
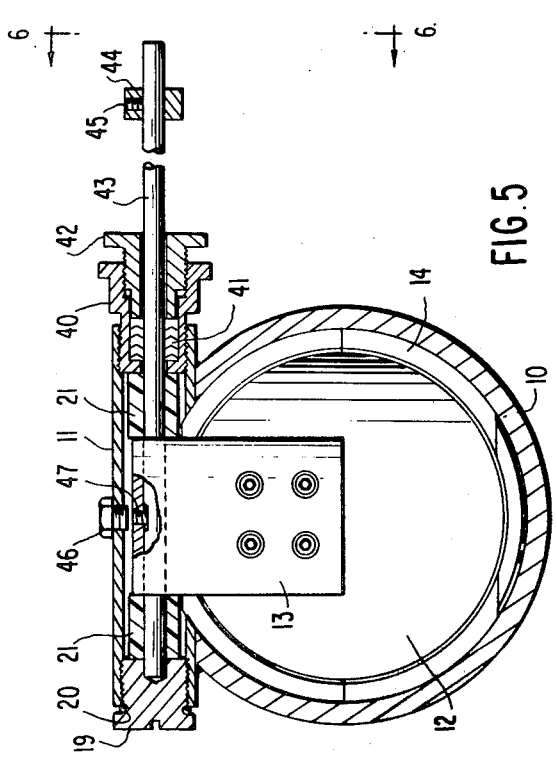
FIG. 5 is a transverse sectional view of the valve with an external shaft.

Referring now to FIG. 5 the valve is shown adaptable to external control of the arcuate valve sealing member 12. Pivot housing 11 is provided at one end with packing gland 40 and packing 41 which is compressed by packing nut 42. An extended pivot shaft 43 extends beyond the pivot pin housing and hinge member 13 is secured to the pivot shaft by means of screw 47, access to which may be provided by plug 46. This arrangement permits a wide variety of external controls to operate the arcuate valve sealing element without themselves being exposed to the environment within the valve.

Figure 6C:
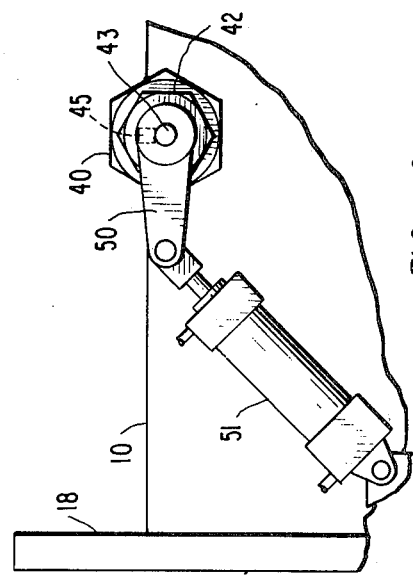
FIG. 6C is a partial elevation view of the valve with an external snubber taken on the axis 6—6 of FIG. 5.
Figure 6B:
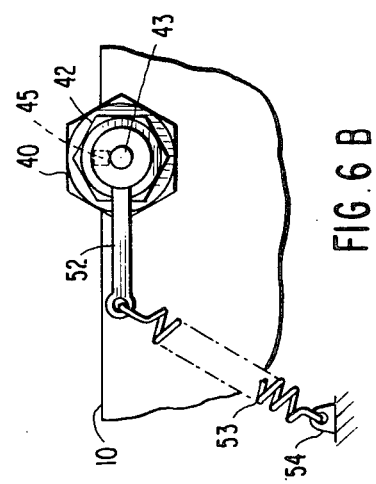
FIG. 6B is a partial elevation view of the valve with an external spring closure taken on the axis 6—6 of FIG. 5.
Figure 6A:
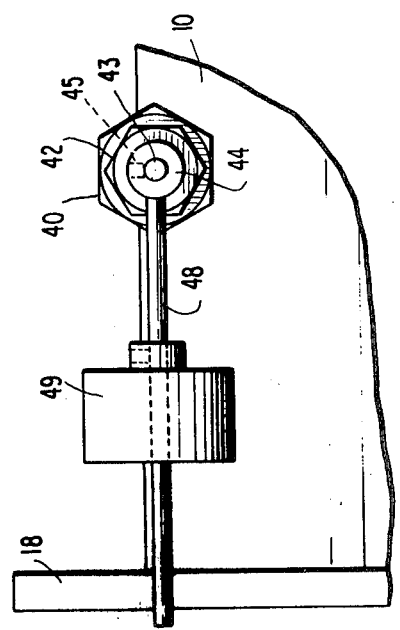
FIG. 6A is a partial elevation view of the valve with an external counterweight taken on the axis 6—6 of FIG. 5.

One control method is shown in FIG. 6A where a collar 44 secured to the shaft 43 by screw 45 supports a counterweight arm 48 and counterweight 49, adjustable to provide a desired sealing force between the arcuate valve sealing member and the valve seat. A second external control method is shown in FIG. 6B wherein a spring arm 52, external spring 53 and spring retainer 54 are provided for preloading the arcuate valve sealing member.

In some other applications of check valves, abrupt flow reverseals occur with the result that the valve sealing member slams from the open position onto the valve seat. In other applications of check valves such as in the discharge of reciprocating pumps, the valve is subject to pulsating flow conditions creating chatter of the sealing elements. Both conditions subject the valve elements to rapid wear and damage unless means are provided to limit the motion of the sealing elements time of closure. FIG. 6C discloses an external snubber 51 connected to the pivot pin 43 by snubber arm 50. Snubber 51 is preferably of a type which permits rapid initial movement of the valve element toward the closed postion and retards its motion just at the point of closure.

Figure 7:
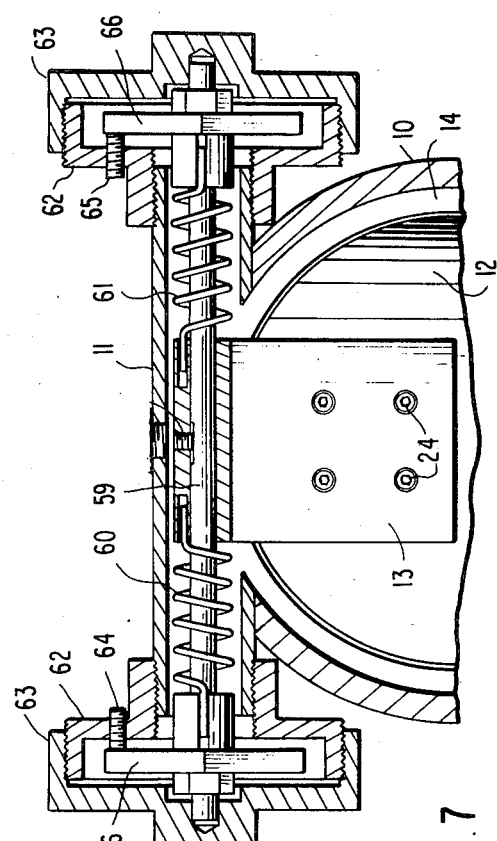
FIG. 7 is a transverse section view of the valve with internal spring closure.

It may not always be desirable to provide external control of the valve sealing element since packing glands develop leaks after a period of operation. Referring now to FIG. 7 an internal spring biasing method is shown. Springs 60 and 61 are contained within pivot pin housing 11, having one end bearing on hinge member 13. Hinge pin housing 11 is provided with housings 62 and closures 63 for containing tension plates 66. The opposite ends of springs 61 are secured in tension plates 66, which are rotatable to apply the desired spring loading to the arcuate valve sealing member 12. With the desired tension applied tension plates 66 are locked by means of locking screws 64 and 65.

From the above description it will be understood how the arcuate check valve provides a bi-planar sealing surface at a fixed angle to the direction of reverse flow through the valve facilitating obtaining a leakproof seal and how the configuration described adapts itself to internal or external control of the sealing element.

While I have shown all of the several embodiments of the present invention known to me, it is understood that other changes or modifications may be made by those skilled in the art and I desire not to be limited to the particular details shown but to cover all such modifications as may be encompassed by the scope of the following claims.

What is claimed is:

1. In a swing check valve having a body portion defining a fluid passage therethrough, a valve seat mounted in said body, a pivot member supported by said body, a pivotable sealing member rotatable around said pivot pin for engaging said valve seat for closure of the fluid passage when flow is in one direction and movement away from the valve seat when flow is in the opposite direction, the improvement comprising: said valve seat having a bi-planar sealing surface developed by making two intersecting 45 degree cuts from the transverse end plane of a tubular member to the horizontal diametral plane and said valve sealing member having an arcuate configuration and having a bi-planar sealing surface developed by making two intersecting 45 degree cuts from the periphery of a corresponding tubular member to the horizontal diametral plane using the portion removed to produce an arcuate sealing member mating with said valve seat in the closed position and having the configuration of the inner wall of said body when rotated 90 degrees to the open position.

2. The valve of claim 1 wherein said pivot means comprises a fixed pivot pin and said arcuate sealing member is freely pivotable on said fixed pin.

3. The valve of claim 2 further comprising one or more helical springs supported by said pivot pin for engagement with said arcuate sealing member for forcing said arcuate sealing member into engagement with said valve seat.

4. The valve of claim 1 wherein said pivot means comprises a rotatable pivot shaft, said arcuate sealing member fastened to said rotatable pivot shaft, said pivot shaft having one or more ends extending from said pivot housing.

5. The valve of claim 4 further comprising an arm and counterweight secured to said pivot shaft for rotating said pivot shaft in a direction so as to cause said arcuate valve sealing member to engage said valve seat.

6. The valve of claim 4 further comprising a lever arm secured to said pivot shaft and spring acting on said lever arm for rotating said pivot shaft in a direction so as to cause said arcuate valve sealing member to engage said valve seat.

7. The valve of claim 4 further comprising an arm and external damping device secured to said pivot shaft for retarding the movement of said arcuate valve sealing member from the open position to the closed position when flow is suddenly reversed.

8. An arcuate swing check valve comprising, in combination, a tubular valve body defining a fluid passage therethrough, a valve seat disposed in said body further defining a portion of said fluid passage, said valve seat having a bi-planar sealing surface developed by making two intersecting 45 degree cuts from the the transverse end plane of said seat to the diametral horizontal plane, a transverse pivot housing on said body external to said fluid passage and connected thereto, pivot means in said housing for pivotally mounting an arcuate valve sealing member in said fluid passage for rotation between a closed position for engaging said valve seat and preventing flow in one direction and an open position 90 degrees removed from said closed position whereby said arcuate valve sealing member is in symmetrical conformation with the interior wall of said valve body and defines a substantially cylindrical fluid passage with no restriction to flow through the valve or to the passage of solid objects therethrough, said arcuate sealing member having a configuration developed by making two intersecting 45 degree cuts from the periphery of a tubular member having a complementary configuration to that of the valve seat to the diametral horizontal plane using the portion removed as the arcuate sealing member producing a semi-circular arcuate valve sealing member having a bi-planar sealing surface for mating with the valve seat.

9. An arcuate swing check valve comprising, in combination, a tubular valve body defining a fluid passage therethrough, a tubular insert in said body, a valve seat retained in said body by said tubular insert further defining a portion of said fluid passage, said valve seat having a bi-planar sealing surface developed by making two intersecting 45 degree cuts from the the transverse end plane of said seat to the diametral horizontal plane, said tubular insert having internal face surfaces developed in the same manner as the sealing surfaces of said valve seat, the apices of said tubular insert extending axially beyond the apices of said valve seat in the horizontal diametral plane, a transverse pivot housing on said body external to said fluid passage and connected thereto, pivot means in said housing for pivotally mounting an arcuate valve sealing member in said fluid passage for rotation between a closed position for engaging said valve seat and preventing flow in one direction and an open position 90 degrees removed from said closed position whereby said arcuate valve sealing member is in symmetrical conformation with the interior wall of said valve body and defines a substantially cylindrical fluid passage with no restriction to flow through the valve or to the passage of solid objects therethrough, said arcuate sealing member having a configuration developed by making two intersecting 45 degree cuts from the periphery of a tubular member having a complementary configuration to that of the valve seat to the diametral horizontal plane using the portion removed as the arcuate sealing member producing a semicircular arcuate valve sealing member having bi-planar sealing surfaces for mating with the valve seat.

10. The valve of claim 9 wherein said pivot means comprises a fixed pivot pin and said arcuate sealing member is freely pivotable on said fixed pin.

11. The valve of claim 10 further comprising one or more helical springs supported by said pivot pin for engagement with said arcuate sealing member for forcing said arcuate sealing member into engagement with said valve seat.

12. The valve of claim 9 wherein said pivot means comprises a rotatable pivot shaft, said arcuate sealing member fastened to said rotatable pivot shaft, said pivot shaft having one or more ends extending from said pivot housing.

13. The valve of claim 12 further comprising an arm and counterweight secured to said pivot shaft for rotating said pivot shaft in a direction so as to cause said arcuate valve sealing member to engage said valve seat.

14. The valve of claim 12 further comprising a lever arm secured to said pivot shaft and spring acting on said lever arm for rotating said pivot shaft in a direction so as to cause said arcuate valve sealing member to engage said valve seat.

15. The valve of claim 12 further comprising an arm and external damping device secured to said pivot shaft for retarding the movement of said arcuate valve sealing member from the open position to the closed position when flow is suddenly reversed.

* * * * *